May 7, 1968 K. W. RICHARDSON ET AL 3,382,042
PROCESS FOR PREPARING METAL OXIDES
Filed June 22, 1964 4 Sheets-Sheet 1

INVENTORS
KENNETH W. RICHARDSON
BY FRANKLIN STRAIN and
WILLIAM L. WILSON
Chisholm and Spencer
ATTORNEYS May 7, 1968   K. W. RICHARDSON ET AL   3,382,042
PROCESS FOR PREPARING METAL OXIDES Filed June 22, 1964   4 Sheets-Sheet 2

INVENTORS
KENNETH W. RICHARDSON
FRANKLIN STRAIN and
WILLIAM L. WILSON
BY Chisholm and Spencer
ATTORNEYS

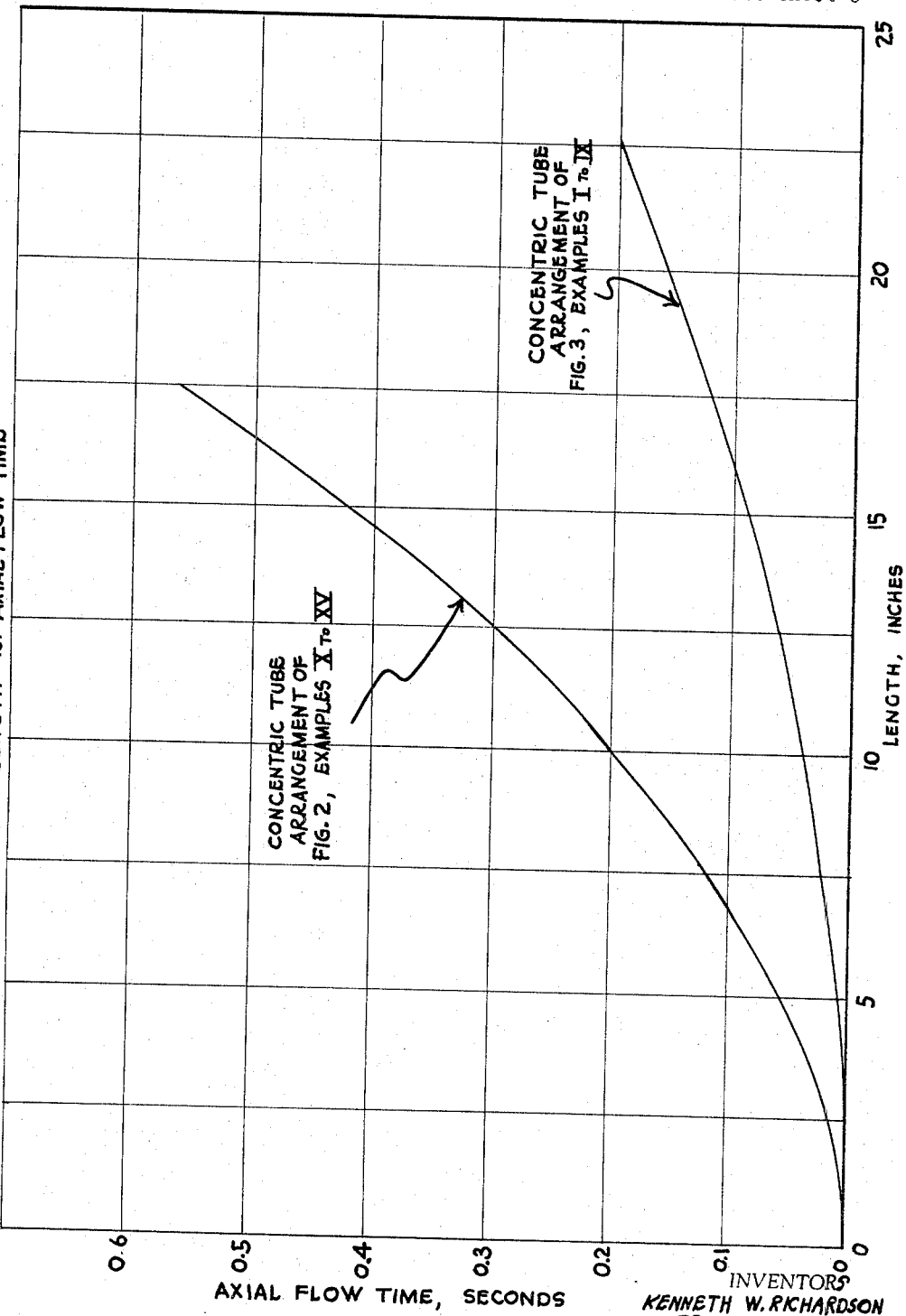

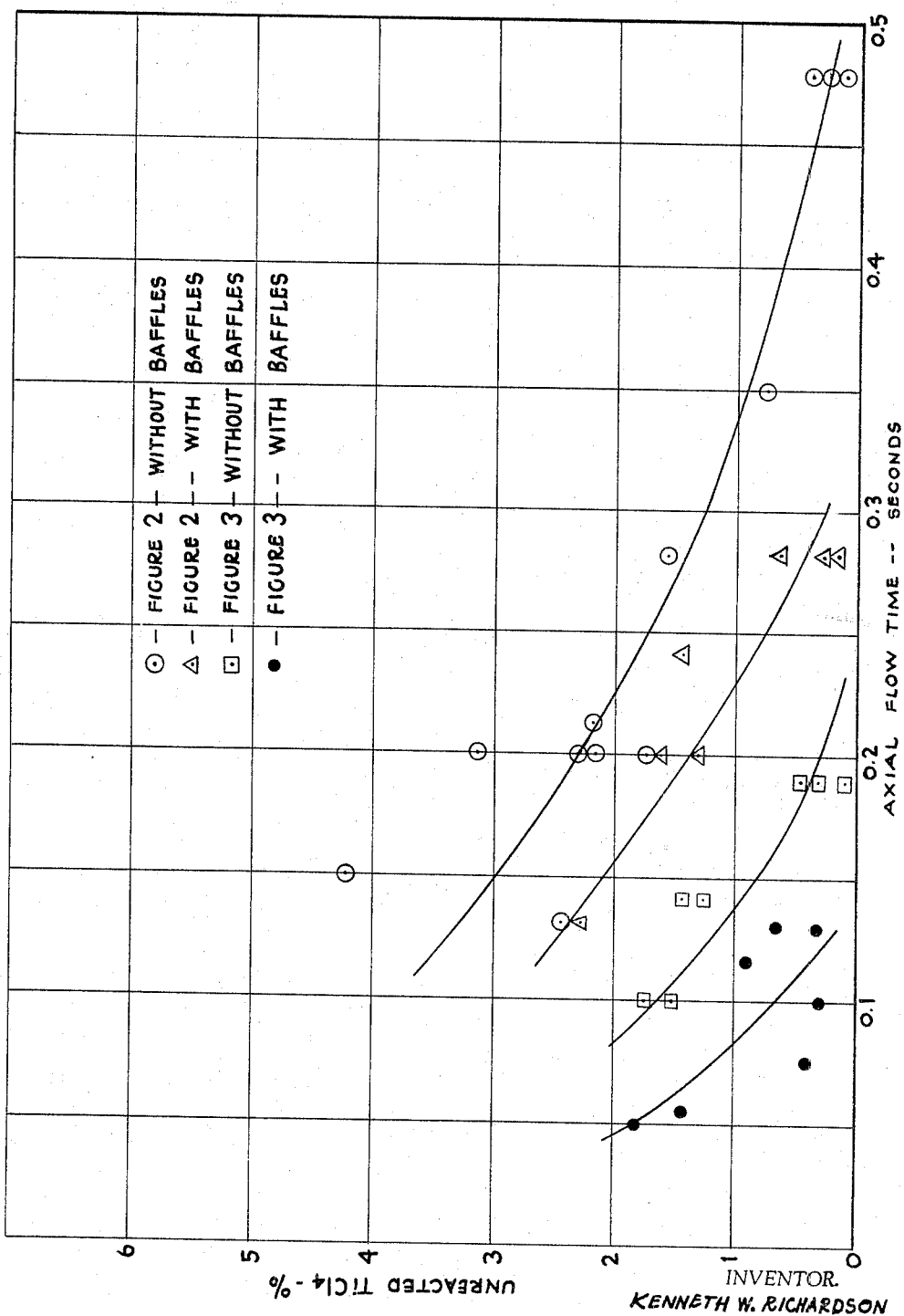

United States Patent Office 3,382,042
Patented May 7, 1968

3,382,042
PROCESS FOR PREPARING METAL OXIDES
Kenneth W. Richardson, Franklin Strain, and William L. Wilson, Barberton, Ohio, assignors to Pittsburgh Plate Glass Company, Pittsburgh, Pa., a corporation of Pennsylvania
Filed June 22, 1964, Ser. No. 376,980
15 Claims. (Cl. 23—202)

ABSTRACT OF THE DISCLOSURE

Pigmentary metal oxide, e.g., titanium dioxide, is produced by introducing metal halide, e.g., titanium tetrahalide, and oxygenating gas into a reactor maintained at reaction temperatures and withdrawing a gaseous effluent suspension of metal oxide from the reactor. The concentration of unreacted metal halide and oxygen in the effluent is reduced by interrupting the normal flow of the gaseous reactant stream.

---

This invention relates to the production of metal oxides, notably white metal oxides. More specifically, this invention involves the production of metal oxides, particularly pigmentary titanium dioxide by the vapor phase oxidation titanium tetrahalide.

In the production of metal oxide vapor phase oxidation of one or more metal halides, a metal halide is oxidized by reaction in the vapor phase by an oxygenating gas, e.g., oxygen, $NO_2$, NO, $H_2O_2$, in a relatively confined area maintained at a temperature at which the vaporous halide and oxygen react. Where the reactants are, for example, titanium tetrachloride and oxygen, the temperature of the reaction zone is maintained above 500° C., preferably 800° C. to 1600° C.

In a vapor phase oxidation process, it is especially useful and advantageous to introduce the reactant gas streams, e.g., titanium tetrahalide and an oxygenating gas, separately into the reaction zone by means of a series of concentric tubes and annuli such as taught in U.S. Letters Patent 2,968,592, issued to Wilson. In more sophisticated processes such as disclosed in U.S. Letters Patent 3,069,- 281 issued to Wilson, additional gas streams, e.g., inert gases, are separately introduced into the reaction zone via additional concentric tubes.

It has been discovered that as the various gas streams, e.g., reactants and/or inert gases pass through the reaction zone within the closed reactor, the gas stream at or near the center of the reactor will flow at a greater linear and mass velocity than the gas stream at or near the circumference or perimeter of the reactor. Thus, it has now been observed that although the average retention time of the gaseous product stream will be greater than 5 seconds, usually 10 to 40 seconds, the central core of the gas stream along the axis of the reactor will jet through the reactor and thus have a retention time less than that required for diffusion and chemical reaction, e.g., a retention time below about 0.25 second.

Thus as the effluent gaseous product stream is continuously withdrawn from the reactor, the central core of the stream will contain a high percentage of unreacted gases, e.g., vaporous unreacted metal halide such as $TiCl_4$, relative to the unreacted gases in that portion of the gas stream flowing at or near the reactor walls or internal circumference. Thus, in the vapor phase oxidation of titanium tetrachloride, the central gas stream may be emitted from the reactor with 20 mole percent or more unreacted titanium tetrachloride based upon the original titanium tetrachloride introduced into the reactor. Although the effects of this unreacted titanium tetrachloride is diluted by mixing with the other portions of the effluent product stream, the overall product stream may still average up to 6 percent or more unreacted titanium tetrachloride.

Even though the reactor is maintained at equilibrium conditions, e.g., reaction temperature, and even though there is complete intimate mixing of the gases within the central axial stream, there still will be unreacted metal halides since the retention time of the central stream is less than the time necessary for reaction which requires at least about 0.25 second. Although the retention time might be increased by lengthening the reactor chamber, this becomes impractical on a commercial scale where reactor length is limited by such factors as capital investment and heat losses.

Although the amount of unreacted halide, e.g., $TiCl_4$, may be partly reduced by the introduction of excess oxygenating gas, e.g., in excess of 200 mole percent $O_2$, based on the moles of $TiCl_4$ fed to the reactor, such necessitates the design and use of larger process equipment which directly affects and increases the economics of a commercial operation. Accordingly, the present invention is particularly suitable in a commercial operation wherein there is introduced a stoichiometric amount of oxygenating gas, e.g., 90 to 130 mole percent oxygenating gas based on the moles of metal halide; that is, an oxygenating gas to metal halide mole ratio of 0.90 to 1.30.

This invention is particularly suitable for use in a process where all of the reactants, e.g., $TiCl_4$ and $O_2$, are introduced at one end of a closed reactor and the product is withdrawn from the opposite end.

In accordance with the present invention, the higher velocity axially flowing gas stream is retarded and deflected such that a lateral motion is imparted to the stream.

Thus, in the practice of the invention, obstruction means are axially located and positioned in the center of the reactor so as to hinder, impede, impinge, and disturb the jet effect of the higher velocity axial or central core of the gaseous stream flowing through the reactor, to increase thereby the effective retention time of the axial core.

In one specific example of the practice of this invention, a baffle plate is positioned near the center of the reactor substantially transverse to the direction of flow of that portion of the stream following along the reactor axis, so as to impede, impinge, interrupt, and restrain the axial flow for a period of time sufficient to oxidize and react a substantial portion of the unreacted metal halide, e.g., titanium tetrachloride.

The invention will be better understood by reference to the accompanying drawings and the figures contained thereon which comprise a part of this specification.

FIGURE 1 illustrates the velocity flow pattern of profile of the gases, e.g., vaporous metal halide, oxygen, and inert gases such as chlorine and/or carbon dioxide, flowing through the reactor. As illustrated in FIGURE 1, the gas flow at or near the circumferential wall 9 of the reactor is substantially less than the velocity of the central core of the stream. This velocity profile will not be substantially altered by a change from turbulent to laminar flow, or vice versa. In other words, the velocity profile will remain relatively constant regardless of the average velocity and Reynolds number of the gas stream.

FIGURE 2 represents one preferred embodiment of the present invention. More particularly FIGURE 2 shows a cylindrical reaction chamber 8 having a wall 9 with various out gas streams, e.g., oxygen, metal halide and inert gas, being introduced at one end of the reactor through a series of concentric tubes 1, 2, and 3. Concentric tube 1 is provided with a circular lip 14 extending in a plane perpendicular to the common longitudinal axis of the concentric tubes, there being a circumferential slot S between lip 14 and the end of tube 2. There is a circular opening in lip 14 having an internal diameter D. As is shown further in the drawing, oxygen is introduced through central tube 3 while an inert gas is introduced from tube 6 to the annulus 5 formed by concentric tubes 2 and 3, and metal halide is introduced from tube 7 into the annulus 4 formed by concentric tubes 1 and 2.

The gas streams are emitted into the reaction zone from the concentric tubes, the inert gas stream serving as a substantially uniform concentric shroud between the metal halide and oxygen so as to prevent oxide growth at the tube outlets, e.g., at or near the lip 14. Preferably the oxygen stream is introduced at a higher velocity than the other gas streams as disclosed in copending U.S. application Ser. No. 190,140, filed Apr. 25, 1962 by William L. Wilson, now United States Patent 3,214,284, the higher velocity oxygen stream sucking and merging the lower velocity titanium tetrahalide and inert gas streams into it as the streams gradually flow through the reactor, thereby achieving intimate mixture of the reactants.

It is to be noted that the concentric tube arrangement as illustrated in FIGURE 2 is but one way in which the various gas streams may be introduced into the reactor. Accordingly, it is to be understood that any of the prior art processes may be employed. For example, reference is made to U.S. Letters Patent 2,980,509 issued to Frey; 2,394,633 issued to Pechukas; 2,340,610 issued to Muskat; 2,653,078 issued to Lane; 2,670,272 issued to Nutting; and U.S. Letters Patent 2,791,490 issued to Willcox. Also reference is made to U.S. Letters Patents 2,450,156 and 3,078,148.

As the gas streams flow through the reactor 8, the central portion or axial core of the gas stream encounters a baffle or plate 10 fixed within the central portion of the reactor. The plate is shown in FIGURE 2 as being attached to a rod or support 11 attached to the bottom of the reactor. The effluent product stream is then withdrawn from the reactor through conduit 12. A hopper 13 may be provided as shown at or near the exit for the collection of coarse, non-pigmentary metal oxide.

FIGURE 3 illustrates a further concentric tube arrangement. More particularly, there is shown concentric tubes 23, 22, and 21 forming annuli 24 and 25. Tube 22 is provided with a circular lip 31 extending in a plane perpendicular to the common axis of the three concentric tubes 23, 22, and 21, there being a circumferential slot $S_1$ between the end 30 of tube 23 and circular lip 31. There is a circular opening in the lip 31 having an internal diameter $D_1$.

Tube 21 is provided with a circular lip 32 which extends in a plane substantially parallel to the plane of lip 31, there being a circular opening in lip 32 of a diameter $D_2$. There is a circumferential slot $S_2$ between lips 31 and 32.

Figure 7:
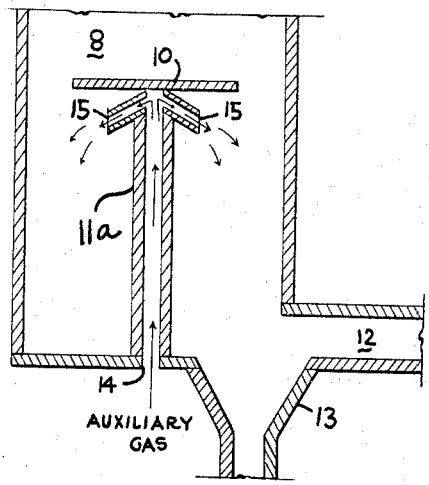
Figure 8:
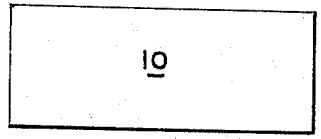
Figure 9:
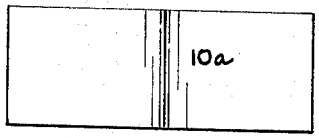
Figure 10:
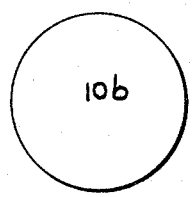
Figure 11:
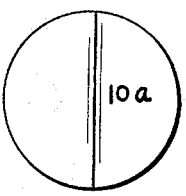

FIGURE 7 shows a further modification of the present invention in which the baffle or plate 10 is supported by a tube 11a containing ports 15. In this embodiment, an auxiliary gas is introduced through opening 14 into tube 11a and emitted into the reactor through ports 15 for cooling, nucleating, and/or further reacting of the product stream.

The auxiliary gas may comprise a recycled gas stream containing unreacted metal halide, e.g., titanium tetrachloride, inert gases, and oxygen. Examples of inert gases, not by way of limitation, which may be supplied to the reactor with the reactants, e.g., through the concentric tubes and/or in a recycle stream through ports 15, are argon, nitrogen, helium, krypton, xenon, chlorine, or mixtures thereof. Likewise, the recycle stream may comprise carbon dioxide and/or other products of combustion where CO, natural gas, or sulfur-containing compounds have been employed as an original source of heat for the reactor. Likewise, additional gas streams other than a recycled gas may be introduced, e.g., oxygen or nucleating agents, such as silicon tetrachloride, aluminum trichloride, potassium compounds, organic compounds as disclosed in Canadian Patents 631,871 and 639,659 and U.S. Letters Patent 3,068,113.

FIGURES 8, 9, 10, and 11 represent plan views of various geometrical shapes which may be employed in the construction of the baffle or deflector plate. It is, of course, to be understood that other geometrical designs can be employed by one skilled in the art and are envisioned to be within the scope of the present invention.

Although the invention has been illustrated in FIGURES 2 to 6 as comprising support means such as rod 11 or tube 11a, it is to be understood that other support means may be provided. More specifically, the baffle or plates 10, 10a, 10b, or equivalent designs can be fixed to and supported by a wall cleaning device, for example, the axis of a rotating wall dedusting device comprising ceramic edges which brushingly contacts the inside wall of the reactor thereby removing metal oxide accumulation.

In order to prevent metal oxide growth on the baffles, the baffles should be constructed of nickel or a nickel alloy preferably internally cooled by a fluid such as air to a temperature below 1000° F. Other metal alloys may be employed providing such alloys will not be corroded by chlorine at 800 to 1000° F. Compositions of specific nickel alloys which are contemplated to be used herein are listed on pages 4 and 6 in the Handbook of Huntington Alloys, published and copyrighted by the International Nickel Company, Inc., March 1962, particularly that nickel alloy designated as Nickel 200 consisting of 99.5 percent by weight, 0.06 percent by weight carbon, 0.25 percent by weight manganese, 0.15 percent by weight iron, 0.005 percent by weight sulphur, 0.05 percent by weight silicon, and .05 percent by weight copper.

In a further embodiment of this invention, the axis of the concentric tubes' arrangement is tilted with respect to the axis of the reactor such that the gases are emitted at an angle of 5° to 85° with respect to the longitudinal axis. Such an embodiment may be used either in the presence or absence of a baffle.

Figure 3:
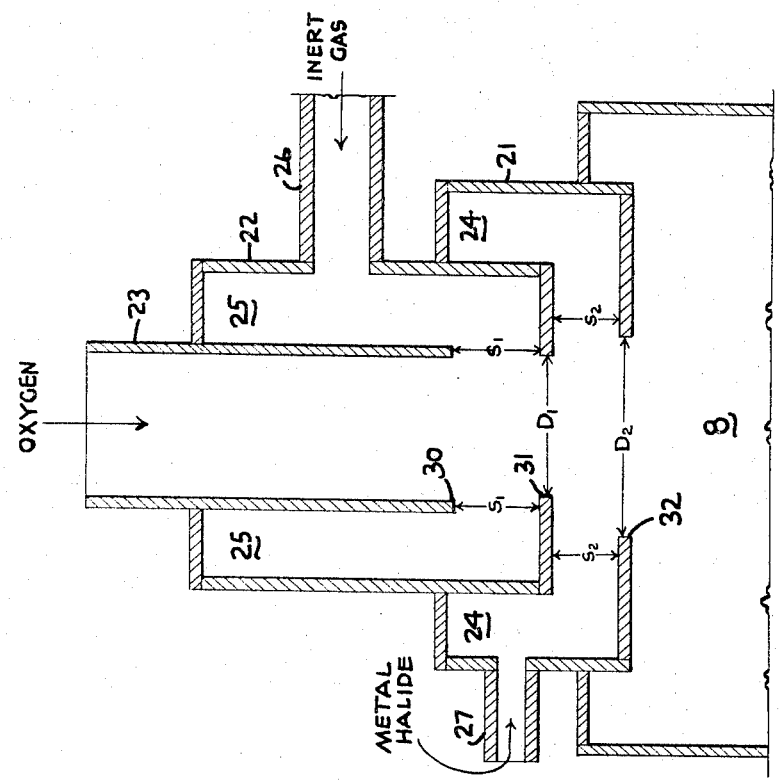
Figure 4:
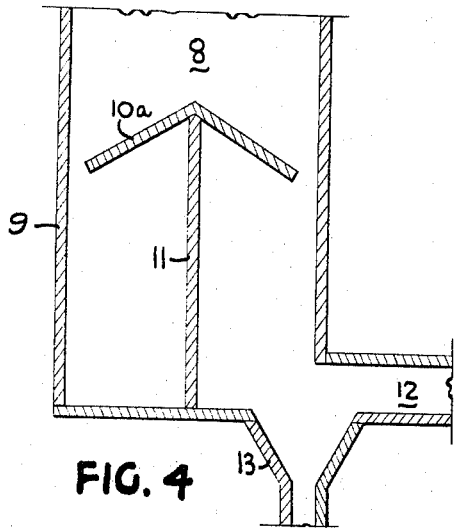
FIGURE 4 shows a further embodiment of the present invention. More particularly, the baffle or plate 10a is positioned at an angle to the flow of the gas stream.
Figure 5:
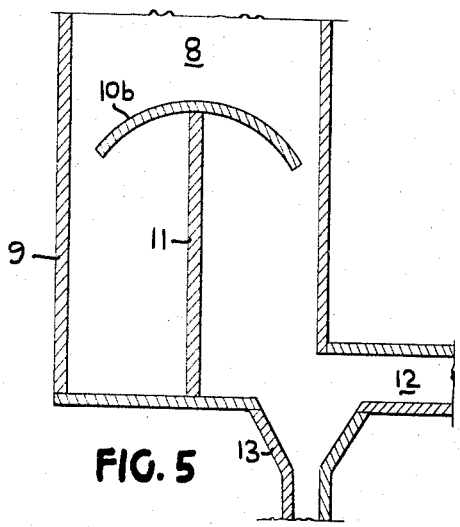
FIGURE 5 shows a further modification of the present invention in which the baffle plate 10b is hemispherical, being curved downwardly in the direction of the gas flow. Likewise, the hemisphere may be curved upwardly in a direction opposing the gas flow through the reactor as shown in FIGURE 6.

The overall mean diameter or width of the baffle plate as measured in the plan view should be greater in mean width or diameter than that of the higher velocity axial or central core of the gas stream which will range from ¼ to ⅘ the mean diameter or width of the reactor. More particularly, the baffle plate should have a mean width or diameter ratio of at least 0.25 to 0.90, preferably 0.33 to 0.875, with respect to the mean width or diameter of the reactor such that the baffle covers 6.25 to 81 percent of the cross-sectional area of the reactor transverse to the flow of the gas stream.

Where a baffle plate 10a or 10b is provided as in FIGURES 3 and 4, the slope, angle of curvature, or tilt of the plate with respect to the direction of gas flow ranges from 5° to 90°.

The baffle plate is preferably positioned at least 0.03 second axial flow time downstream from the point or points at which the various gases are introduced into the reaction chamber, e.g., the outlets of the concentric tubes, the time lapse being calculated from the maximum velocity of the axial flow stream. When the baffle plate is positioned too close to the inlet or inlets of the gas stream, e.g., 0.01 second downstream, a non-pigmentary metal oxide crust or growth builds up on the baffle plate.

The axial flow time is calculated from the axial flow velocity of the central core or jet of the gas stream. This velocity will not remain constant but will be constantly decreasing and decelerating by a logarithmic function due to the expansion of the central axial stream. For every 5 diameters in linear distance traveled downstream based on the original diameter of the axial stream, the stream aspirates a volume of gas equivalent to the original volume of the axial stream. Thus where the original diameter of the axial gas stream is W and travels to 5W, the gas velocity will be one-half the original rate. As the gas further travels to 10W, the velocity will be one-third the original rate. When the gas travels to 15W, the velocity will decrease to one-fourth.

The rule as stated above is accurate only within broad limits, e.g., above about 0.15 second. For more narrow ranges, it is necessary to employ more sophisticated methods of measurement and calculation. FIGURE 12 represents a graphic illustration of such measurements and calculations for the concentric tube arrangement of FIGURE 2 as employed in Examples X to XV, and the arrangement of FIGURE 3 as employed in Examples I to IX. More particularly, there is plotted axial flow time versus the flow length measured axially from the outlet end of the concentric tube arrangement to a particular point in the reactor, e.g., to a baffle plate or the outlet end of the reactor.

Figure 2:
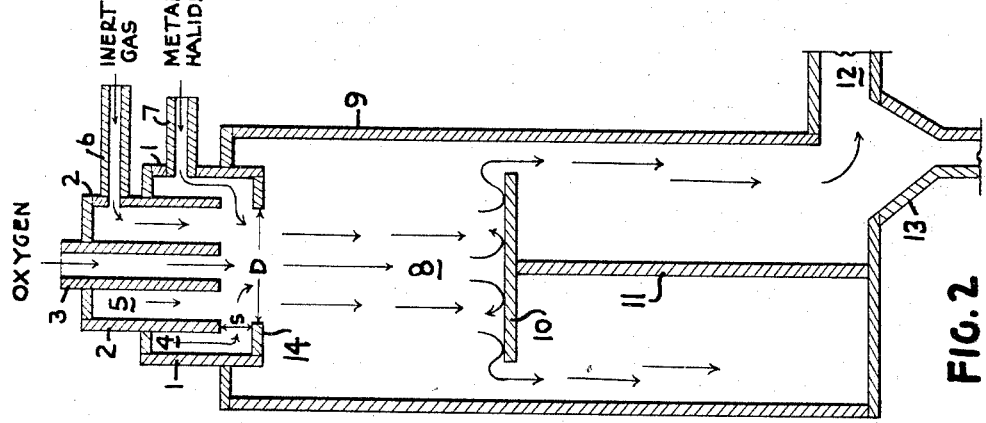
Figure 1:
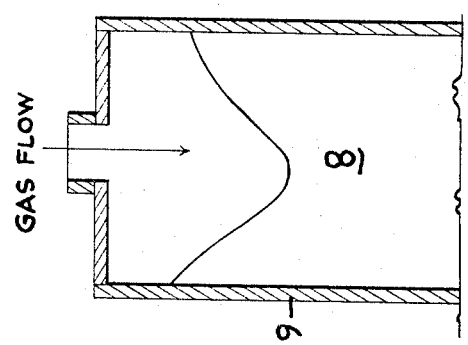

In the practice of this invention for producing pigmentary $TiO_2$, the peak temperature in the reactor at a position 0.002 to 0.03 second downstream from the outlet end of the concentric tubes, e.g., of FIGURES 2 and 3, is maintained below about 1100° C. to obtain $TiO_2$ pigments with a tinting strength of 1600 or higher.

The tinting strength of the $TiO_2$ pigment is determined in accordance with ASTM D-332-26, "1949 Book of ASTM Standards" part 4, page 31, published by American Society for Testing Material, Philadelphia 3, Pa.

Example I

The concentric tube arrangement of FIGURE 3 was employed in conjunction with a reactor 8 having an internal diameter of 4 inches and a length of 16 inches. No baffle was inserted in the reactor. The innermost concentric tube 23 had an internal diameter of 3.4 millimeters. Circumferential slot $S_1$ of tube 22 was 0.70 millimeter with a diameter $D_1$ of 6 millimeters for the circular opening. Circumferential slot $S_2$ of tube 21 was 1.0 millimeter with a diameter $D_2$ of 7 millimeters.

80 millimoles per minute of $TiCl_4$ containing 3 mole percent of $AlCl_3$ and 0.40 mole percent of $SiCl_4$ was preheated to 600° C. and introduced into the reactor 8 through circumferential slot $S_2$ of tube 21.

A gaseous mixture of 96 millimoles per minute of oxygen and 50 millimoles per minute of $CO_2$ at 1700° C. to 1800° C. was introduced into the reactor from concentric tube 23, the oxygen having been preheated in a carbon monoxide combustion zone wherein 50 millimoles per minute of CO was reacted with 25 millimoles per minute of excess oxygen.

Simultaneously a chlorine shroud at 600° C. was emitted from circumferential slot $S_1$ of tube 22 at the rate of 30 millimoles per minute.

Pigmentary 97 percent rutile $TiO_2$ was withdrawn from the bottom of reactor 8 in an effluent gaseous product stream, the pigment having a tinting strength of 1600 on the Reynolds scale. The effluent product stream comprised 1.5 percent unreacted $TiCl_4$ based on the $TiCl_4$ introduced through slot $S_2$, equivalent to 1.2 millimoles per minute of unreacted $TiCl_4$.

Example II

The concentric tube arrangement and dimensions of Example I were employed. No baffle was inserted into the reactor. The temperature and flow rate conditions of the $TiCl_4$ and chlorine shroud were the same as in Example I.

104 millimoles per minute of oxygen and 50 millimoles of $CO_2$ at 1700° C. to 1800° C. was introduced into the reactor 8 from tube 23.

Pigmentary 97 percent rutile $TiO_2$ was withdrawn from the bottom of reactor 8 in an effluent gaseous product stream, the pigment having a tinting strength of 1550. The effluent product stream contained 1.1 percent unreacted $TiCl_4$, equivalent to 0.88 millimoles per minute of unreacted $TiCl_4$.

Example III

The concentric tube arrangement and dimensions of Example I were employed. No baffle was inserted into the reactor. The temperature and flow rate conditions of the $TiCl_4$ and chlorine shroud were the same as in Example I.

88 millimoles per minute of oxygen and 50 millimoles of $CO_2$ at 1700° C. to 1800° C. was introduced into reactor 8 from tube 23.

Pigmentary 97 percent rutile $TiO_2$ was withdrawn from the bottom of the reactor in an effluent gaseous product stream, the pigment having a tinting strength of 1540. The effluent product stream contained 3.6 percent unreacted $TiCl_4$, equivalent to 2.88 millimoles per minute of unreacted $TiCl_4$.

Example IV

The concentric tube arrangement of Example I was employed. However, the reactor length was increased to 18 inches. No baffle plate was inserted into the reactor. The temperature and flow rate conditions of the $TiCl_4$, chlorine shroud, oxygen, and $CO_2$ were the same as in Example I.

Pigmentary 99 percent rutile $TiO_2$ was withdrawn from the bottom of the reactor in an effluent gaseous product stream, the pigment having a tinting strength of 1590. The effluent product stream contained 1.3 percent unreacted $TiCl_4$, equivalent to 1.040 millimoles per minute of unreacted $TiCl_4$.

Example V

The concentric tube arrangement of Example I was employed. The temperature and flow rate conditions of the $TiCl_4$, chlorine shroud, oxygen, and $CO_2$ were the same as in Example I.

A baffle in the shape of a circular flat plate 2¼ inches in diameter was inserted and positioned within the reactor 8 as shown in FIGURE 2, the plate being at a distance of 14 inches downstream from the circular opening in lip 32 (FIGURE 3), equivalent to 0.075 second axial flow time based on the velocity of the central core or axial portion of the gas stream flow through the reactor. The velocity was calculated as hereinbefore described.

Pigmentary 98 percent rutile $TiO_2$ was withdrawn from the reactor at the bottom in an effluent gaseous product stream, the pigment having a tinting strength of 1570. The effluent product stream contained 0.3 percent unreacted $TiCl_4$ equivalent to 0.24 millimole per minute of $TiCl_4$.

Example VI

The concentric tube arrangement of Example I was employed. However, the length of reactor 8 was increased to 17 inches. The temperature and flow rates conditions of the $TiCl_4$, chlorine shroud, oxygen, and $CO_2$ were the same as in Example I.

A circular flat plate baffle 2¼ inches in diameter was inserted in the reactor 8 as shown in FIGURE 2 at a distance of 13 inches downstream from the circular opening in lip 32, equivalent to 0.065 second axial flow time based on the velocity of the axial flow stream.

Pigmentary 97 percent rutile $TiO_2$ was withdrawn from the reactor at the bottom in an effluent product stream, the pigment having a tinting strength of 1580. The effluent product stream contained 0.9 percent unreacted $TiCl_4$ equivalent to 0.72 millimole per minute of $TiCl_4$.

Example VII

The concentric tube arrangement of Example I was employed with a reactor length of 18 inches. The temperature and flow rate conditions of the $TiCl_4$, chlorine shroud, oxygen and $CO_2$ were the same as in Example I.

A circular flat plate baffle 2¼ inches in diameter was inserted in the reactor 8 as shown in FIGURE 2 at a distance of 12 inches downstream from the circular opening in lip 32, equivalent to 0.055 second axial flow time based on the velocity of the axial stream flow.

Pigmentary 97 percent rutile $TiO_2$ was withdrawn from the reactor at the bottom in an effluent product stream, the pigment having a tinting strength of 1580. The effluent product stream contained 0.3 percent unreacted $TiCl_4$ equivalent to 0.24 millimole per minute of $TiCl_4$.

Example VIII

The process conditions of Example VII were repeated except that the baffle plate was positioned at a distance of 16 inches downstream from the circular opening in lip 32, equivalent to 0.10 second axial flow time based on the velocity of the axial flow stream.

Pigmentary 97 percent rutile $TiO_2$ was withdrawn from the reactor at the bottom in an effluent product stream, the pigment having a tinting strength of 1570. The effluent product stream contained 0.3 percent unreacted $TiCl_4$ equivalent to 0.24 millimole per minute of $TiCl_4$.

Example IX

The process conditions of Example VII were repeated except that the baffle plate was positioned at a distance of 14 inches downstream from the circular opening in lip 32, equivalent to .075 second axial flow time based on the velocity of the axial flow.

Pigmentary 97 percent rutile $TiO_2$ was withdrawn from the reactor at the bottom in an effluent products stream, the pigment having a tinting strength of 1570. The effluence product stream contained 0.4 percent unreacted $TiCl_4$ equivalent to 0.32 millimole per minute of $TiCl_4$.

Example X

A concentric tube arrangement as illustrated in FIGURE 2 was employed with a reactor 8 having an internal diameter of 4 inches and a length of 16 inches. No baffle was positioned in the reactor.

80 millimoles per minute of $TiCl_4$ containing 3 mole percent of $AlCl_3$ and 0.27 mole percent of $SiCl_4$ was preheated to 1000° C. and introduced into the reactor 8 from annulus 4 through circumferential slot opening S of 1.5 centimeter.

Simultaneously 96 millimoles per minute of oxygen at 1000° C. was introduced through tube 3 having a minimum internal diameter of 1.2 centimeter, and 16 millimoles per minute of chlorine shroud at 1000° C. was emitted from annulus 5 having a minimum diameter of 1.4 centimeter and a maximum diameter of 1.6 centimeter.

Pigmentary 99 percent rutile $TiO_2$ was withdrawn from the bottom of the reactor in an effluent product stream, the pigment having a tinting strength of 1570. The effluent gaseous product stream contained 3.1 percent unreacted $TiCl_4$ equivalent to 2.48 millimoles per minute of $TiCl_4$.

Example XI

The concentric tube arrangement of Example X was employed with a reactor length of 12 inches. No baffle was inserted.

The temperature and flow rate conditions of Example X were repeated except that the chlorine shroud was emitted from annulus 5 at 24 millimoles per minute.

Pigmentary 99 percent rutile $TiO_2$ was withdrawn from the reactor bottom in an effluent gaseous product stream and recovered, the $TiO_2$ pigment having a tinting strength of 1610. The effluent product stream contained 1.9 percent unreacted $TiCl_4$ equivalent to .152 millimole per minute.

Example XII

The concentric tube arrangement of Example X was employed with a reactor length of 12 inches.

The temperature and flow rate conditions of Example X were repeated.

Figure 6:
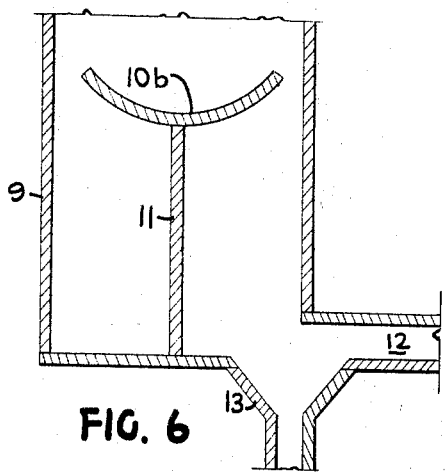

A baffle comprising a 1.75 inch diameter hemisphere curved toward the concentric tube arrangement (as shown in FIGURE 6) was inserted in the reactor 8 and positioned 7.75 inches from lip 14, equivalent to 0.12 second axial flow time based on the velocity of the axial stream.

Pigmentary 98 percent rutile $TiO_2$ was withdrawn from the reactor bottom in an effluent gaseous product stream and recovered, the recovered $TiO_2$ pigment having a tinting strength of 1610. The effluent product stream contained 0.6 percent unreacted $TiCl_4$ equivalent to 0.48 millimole per minute of $TiCl_4$.

Example XIII

The concentric tube arrangement of Example X was employed with a reactor length of 12 inches.

The temperature and flow rate conditions of Example X were repeated.

A flat circular baffle plate of 2.75 inches in diameter was inserted in the reactor as shown in FIGURE 6 and positioned 7.75 inches from lip 14, equivalent to 0.12 second based on the velocity of the axial flow.

Pigmentary 98 percent rutile $TiO_2$ was withdrawn from the reactor bottom in an effluent gaseous product stream and recovered, the recovered $TiO_2$ pigment having a tinting strength of 1610. The effluent product stream contained 0.4 percent unreacted $TiCl_4$ equivalent to 0.32 millimole per minute of $TiCl_4$.

Example XIV

The concentric tube arrangement of Example X was employed with a reactor length of 12 inches.

The temperature and flow rate conditions of Example X were repeated.

A baffle plate 2¼ inches in diameter was inserted and positioned in the reactor at varying distances.

With the baffle positioned at 6 inches from lip 14, equivalent to 0.08 second based on the axial flow velocity, pigmentary 98 percent rutile $TiO_2$ having a tinting strength of 1620 was withdrawn from the reactor in an effluent product stream. The stream contained 0.2 percent $TiCl_4$ based on the original $TiCl_4$ introduced into the reactor, equivalent to 0.16 millimole per minute.

With the baffle positioned at 7 inches from lip 14, equivalent to 0.10 second, pigmentary 97 percent rutile $TiO_2$ was withdrawn and recovered, the pigment having a tinting strength of 1600. The effluent stream contained 0.6 percent unreacted $TiCl_4$ equivalent to 0.48 millimole per minute.

With the baffle positioned at 8 inches from lip 14, equivalent to 0.13 second, pigmentary 98 percent rutile $TiO_2$ was withdrawn and recovered having a tinting strength of 1620. The effluent stream contained 0.1 percent unreacted $TiCl_4$ equivalent to 0.08 millimole per minute.

The baffle was removed from the reactor. Pigmentary 98 percent rutile $TiO_2$ was withdrawn and recovered. The effluent product stream contained 1.4 percent unreacted $TiCl_4$ equivalent to 1.12 millimole per minute.

Example XV

Experiments were conducted to determine the effect of baffle size.

The concentric tube arrangement of Example X was employed with a reactor length of 10 inches.

Circular-shaped baffle plates of varying diameters were positioned in the reactor 8 inches from lip 14 equivalent to 0.13 second axial flow time.

With a baffle diameter of 1.0 inch, the effluent product stream contained 2.2 percent unreacted $TiCl_4$ based on the $TiCl_4$ supplied to the reactor, equivalent to 1.76 millimole per minute.

With the baffle removed, the effluent product stream still contained 2.2 percent unreacted $TiCl_4$.

With a baffle diameter of 2.25 inches, the effluent product stream contained 1.6 percent unreacted $TiCl_4$ equivalent to 1.28 millimoles per minute.

With baffle diameter of 3.5 inches, the effluent product stream contained 1.4 percent unreacted $TiCl_4$ equivalent to 1.12 millimoles per minute.

The results of the Examples I to XV are shown graphically in FIGURE 13 wherein there is plotted unreacted percent $TiCl_4$ (based on the $TiCl_4$ supplied to the reactor) versus the axial flow time.

The results have also been summarized in Tables 1, 2, and 3.

TABLE 1.—CONCENTRIC TUBE ARRANGEMENT OF FIGURE 3

| Example | Reactor Internal Diameter, inches | Reactor Length, inches | Baffle | Baffle Distance, Seconds | Mole Ratio $O_2$ to $TiCl_4$ | Unreacted $TiCl_4$, percent |
|---|---|---|---|---|---|---|
| I | 4 | 16 | None | | 1.2 | 1.5 |
| II | 4 | 16 | do | | 1.3 | 1.1 |
| III | 4 | 16 | do | | 1.1 | 3.6 |
| IV | 4 | 18 | do | | 1.2 | 1.3 |
| V | 4 | 16 | 2¼″ circular flat plate. | 0.075 | 1.2 | 0.3 |
| VI | 4 | 17 | Same | 0.065 | 1.2 | 0.9 |
| VII | 4 | 18 | do | 0.055 | 1.2 | 0.3 |
| VIII | 4 | 18 | do | 0.100 | 1.2 | 0.3 |
| IX | 4 | 18 | do | 0.075 | 1.2 | 0.4 |

TABLE 2.—CONCENTRIC TUBE ARRANGEMENT OF FIGURE 2

| Example | Reactor Internal Diameter, inches | Reactor Length, inches | Baffle | Baffle Distance, Seconds | Mole Ratio $O_2$ to $TiCl_4$ | Unreacted $TiCl_4$, percent |
|---|---|---|---|---|---|---|
| X | 4 | 16 | None | | 1.2 | 3.1 |
| XI | 4 | 12 | do | | 1.2 | 1.9 |
| XII | 4 | 12 | 1.75″ hemisphere curved upwardly. | 0.12 | 1.2 | 0.6 |
| XIII | 4 | 12 | 2.75″ circular flat plate. | 0.12 | 1.2 | 0.4 |
| XIV | 4 | 12 | 2¼″ circular flat plate. | 0.08 | 1.2 | 0.2 |
| XIV | 4 | 12 | Same | 0.10 | 1.2 | 0.6 |
| XIV | 4 | 12 | do | 0.13 | 1.2 | 0.1 |

TABLE 3.—CONCENTRIC TUBE ARRANGEMENT OF FIGURE 2

| Example | Reactor Internal Diameter, inches | Reactor Length, inches | Diameter, Inches, of Circular Flat Baffle | Baffle Distance, seconds | Mole Ratio $O_2$ to $TiCl_4$ | Unreacted $TiCl_4$, percent |
|---|---|---|---|---|---|---|
| XV | 4 | 10 | 1.0 | 0.13 | 1.2 | 2.2 |
| XV | 4 | 10 | 2.25 | 0.13 | 1.2 | 1.6 |
| XV | 4 | 10 | 3.5 | 0.13 | 1.2 | 1.4 |
| XV | 4 | 10 | None | | 1.2 | 2.2 |

Although this invention has been described with particular reference to the production of pigmentary $TiO_2$ from titanium tetrahalide, e.g., $TiCl_4$, $TiBr_4$, and $TiI_4$, it may be employed in the production of other pigmentary metal oxides. The term metal as employed herein is defined as including those elements exhibiting metal-like properties, including the metalloids.

Examples, not by way of limitation, which may be produced by the aforementioned process are the oxides of aluminum, arsenic, beryllium, boron, gadolinium, germanium, hafnium, lanthanum, iron, phosphorus samarium scandium, silicon, strontium, tantalum, tellurium, terbium, thorium, thulium, tin, titanium, yttrium, ytterbium, zinc, zirconium, niobium, gallium, antimony, lead, and mercury.

Likewise, it is to be understood that this invention is not to be limited to the use of one baffle, but a series of baffles may be so employed.

The above description of the invention has been given for purposes of illustration and not limitation. Various changes and modifications which fall within the spirit of the invention and scope of the appended claims will be obvious and apparent to the skilled mechanic and expert in the art. Thus, it will be understood that the invention is in no way to be limited except as set forth in the following claims.

We claim:

1. In a process for producing pigmentary metal oxide by vapor phase oxidation of metal halide with oxygenating gas wherein metal halide and oxygenating gas reactants are introduced into a reactor and a gaseous mixture consisting essentially of said reactants flows through the reactor in a manner that the axial velocity of said gaseous mixture of reactants is greater than its perimetrical velocity and reactor effluent containing unreacted metal halide is withdrawn from the reactor, the improvement which comprises impinging the axial core of said gaseous mixture consisting essentially of said reactants upon obstruction means situated within the reaction zone and downstream from the point introduction of metal halide and oxygenating gas reactants and withdrawing reactor effluent containing less unreacted metal halide than if the obstruction means were absent.

2. The process of claim 1 wherein said obstruction means is a baffle plate.

3. The process of claim 1 wherein said obstruction means occupies from 6.25 to 81 percent of the cross-sectional area of the reactor measured transverse to the flow of the gaseous stream.

4. The process of claim 1 wherein said obstruction means comprises a material selected from the group consisting of metal and metal alloys that are resistant to corrosion by chlorine at 800° F. to 1000° F.

5. The process of claim 1 wherein said obstruction means comprises a material selected from the group consisting of nickel and nickel alloys that are resistant to corrosion by chlorine at temperatures below 1000° F.

6. A process for producing pigmentary titanium dioxide by the vapor phase oxidation of titanium tetrahalide which comprises:

(a) introducing separate concentric streams of vaporous titanium tetrahalide selected from the group consisting of titanium tetrachloride, titanium tetrabromide, and titanium tetraiodide, inert gas, and oxygenating gas into a reaction chamber maintained at reaction temperature, the oxygenating stream being introduced at a higher mass velocity than the other streams such that it sucks and merges the lower velocity streams into it and forms a reaction mixture having a higher axial core velocity than its perimetrical velocity and a mole ratio of oxygen to titanium tetrahalide of from 0.90 to 1.30;

(b) deflecting the axial core of said reaction mixture with a baffle positioned in the reaction zone, downstream from the point of introduction of titanium tetrahalide and oxygenating gas, and in a plane substantially transverse to the path of flow;

(c) and then withdrawing pigmentary titanium dioxide from the reaction chamber.

7. In a process for producing pigmentary titanium dioxide by vapor phase oxidation of titanium tetrahalide selected from the group consisting of titanium tetrachloride, titanium tetrabromide, and titanium tetraiodide, with oxygenating gas wherein titanium tetrahalide and oxygenating gas reactants are introduced into a reactor and a gaseous mixture consisting essentially of said reactants passes through the reactor in a manner that the axial velocity of said gaseous mixture of reactants is greater than its perimetrical velocity and reactor effluent containing unreacted titanium tetrahalide is withdrawn from the reactor, the improvement which comprises increasing the retention time of the reactant gases within the reactor by impinging the axial core of said gaseous mixture consisting essentially of said reactants upon obstruction means situated within the reaction zone and downstream from the point of introduction of titanium tetrahalide and oxygenating gas.

8. In a process for producing pigmentary titanium dioxide by vapor phase oxidation of titanium tetrahalide selected from the group consisting of titanium tetrachloride, titanium tetrabromide, and titanium tetraiodide with oxygenating gas wherein titanium tetrahalide and oxygenating gas reactants are introduced into a reactor and a gaseous mixture consisting essentially of said reactants passes through the reactor such that the central core velocity of said gaseous mixture of reactants is greater than its perimetrical velocity and reactor effluent containing unreacted titanium tetrahalide is withdrawn from the reactor, the improvement which comprises retarding the flow of the central core of said gaseous mixture essentially of said reactants with obstruction means positioned within the reaction zone, downstream from the point of introduction of titanium tetrahalide and oxygenating gas, and in a plane substantially transverse to the direction of flow of the central core of said gaseous stream and withdrawing reactor effluent containing less unreacted titanium tetrahalide than if the obstruction means were absent.

9. In a process for producing pigmentary metal oxide by vapor phase oxidation of metal halide with oxygenating gas wherein metal halide and oxygenating gas reactants are introduced into one end of a closed reactor in a manner that the axial velocity of the resulting gaseous mixture consisting essentially of said rectants forwarded through the reactor is greater than its perimetrical velocity, and product-containing gases containing unreacted metal halide are withdrawn from another end of the reactor, the improvement which comprises increasing the effective retention time of the axial core of said gaseous mixture consisting essentially of said reactants by obstructing the flow of said axial core with obstruction means placed within the reaction zone and downstream from the point of introduction of said metal halide and oxygenating gas reactants and withdrawing product-containing gases containing less unreacted metal halide than if the obstruction means were absent.

10. In a process for producing pigmentary titanium dioxide by the vapor phase oxidation of titanium tetrahalide selected from the group consisting of titanium tetrachloride, titanium tetrabromide, and titanium tetraiodide, with oxygenating gas reactants in a reaction chamber wherein titanium tetrahalide and oxygenating gas are introduced into the reaction chamber and wherein a gaseous mixture consisting essentially of said reactants flows through the reactor in a manner that the axial velocity of said gaseous stream is greater than the velocity radially removed from the axis of flow and an effluent product stream containing unreacted titanium tetrahalide is withdrawn from the reactor, the improvement which comprises increasing the retention time of the reactant gases by disrupting the axial flow pattern of said gaseous mixture consisting essentially of said reactants with obstruction means positioned in the reaction zone and downstream from the point of introduction of said titanium tetrahalide and oxygenating gas reactants and withdrawing an effluent product stream containing less unreacted titanium tetrahalide than if the obstruction means were absent.

11. In a process for producing pigmentary titanium dioxide by the vapor phase oxidation of titanium tetrahalide selected from the group consisting of titanium tetrachloride, titanium tetrabromide, and titanium tetraiodide, with oxygenating gas in a reactor, wherein titanium tetrahalide and oxygenating gas reactants are introduced into a reactor and wherein a mixture consisting essentially of said reactants titanium tetrahalide and oxygenating gas is flowed longitudinally through the reactor such that the axial velocity of said stream is greater than the velocity removed from the longitudinal axis and effluent product containing unreacted metal halide is withdrawn from the reactor, the improvement which comprises decreasing the amount of unreacted titanium tetrahalide in said effluent product withdrawn from the reactor by impinging that portion of the mixture consisting essentially of said reactants flowing along the longitudinal axis of the reactor upon a baffle placed in the reaction zone and downstream from the point of introduction of said titanium tetrahalide and oxygenating gas reactants.

12. A process for increasing the effective length of a longitudinal reactor into which titanium tetrachloride and oxygen reactants are introduced and through which a gaseous mixture consisting essentially of said titanium tetrachloride and oxygen reactants is flowed and reacted, said gaseous mixture of said reactants having an axial velocity greater than its perimetrical velocity, which comprises interrupting that portion of the gaseous mixture consisting essentially of said reactants flowing along the longitudinal axis of the reactor by means of a baffle positioned within the reaction zone, downstream from the point of introduction of titanium tetrachloride and oxygen, and perpendicular to the path of flow.

13. In a process for producing pigmentary titanium dioxide wherein gaseous streams of titanium tetrachloride and oxygen reactants are separately introduced into a reaction chamber maintained above 500° C., mixed to form a gaseous mixture consisting essentially of said reactants that is forwarded through the reaction chamber, and a gaseous product stream containing unreacted titanium tetrachloride is withdrawn from the reaction chamber, said gaseous reaction mixture having an axial velocity greater than its perimetrical velocity as it flows through the reaction chamber, the improvement which comprises retarding and deflecting the higher velocity portion of the gaseous mixture consisting essentially of said reactants within the reaction zone and downstream from the point of introduction of titanium tetrachloride and oxygen reactants such that the gaseous reaction mixture is retained within the chamber for a period of time sufficient to reduce the amount of unreacted titanium tetrachloride in the product stream.

14. In a process of producing metal oxide by vapor phase oxidation of metal halide with oxygenating gas in a reactor wherein metal halide and oxygenating gas reactants are introduced into the reactor and a gaseous mixture consisting essentially of said reactants passes through the reactor, said gaseous mixture of said reactants having an axial velocity greater than its perimetrical velocity as it passes through the reactor, the improvement which comprises increasing the effective retention time of the gaseous mixture consisting essentially of said reactants within the reactor by obstructing the axial flow of said gaseous mixture of reactants with a baffle located within the vapor phase oxidation reaction zone, downstream from the point of introduction of metal halide and oxygenating gas reactants and positioned in a plane substantially transverse to the axial flow of the gaseous stream.

15. In a process for producing pigmentary titanium dioxide by the vapor phase oxidation of titanium tetrahalide wherein separate concentric streams of vaporous titanium tetrahalide, inert gas, and oxygen gas are introduced at one end of an elongated reaction chamber, combined to form a mixture consisting essentially of titanium tetrahalide and oxygen gas as reactants having a higher axial core velocity than perimetrical velocity and an effluent gaseous product stream comprising titanium dioxide, titanium tetrahalide, and oxygen is withdrawn at an opposite end, the improvement which comprises deflecting the axial core of the mixture consisting essentially of titanium tetrahalide and oxygen gas as reactants within the vapor phase oxidation reaction zone and downstream from the point of introduction of titanium tetrahalide and oxygen gas reactants and withdrawing from the reaction chamber a gaseous effluent product stream containing less than 1 mole percent unreacted titanium tetrahalide based on the titanium tetrahalide introduced into the reaction chamber.

References Cited

UNITED STATES PATENTS

| | | | |
|---|---|---|---|
| 1,967,235 | 7/1934 | Ferkel | 23—202 |
| 2,791,490 | 5/1957 | Willcox | 23—202 |
| 3,068,113 | 12/1962 | Strain et al. | 23—202 X |
| 3,069,281 | 12/1962 | Wilson | 23—202 X |

MILTON WEISSMAN, *Primary Examiner.*

EDWARD STERN, OSCAR R. VERTIZ, *Examiners.*

UNITED STATES PATENT OFFICE
CERTIFICATE OF CORRECTION

Patent No. 3,382,042  May 7, 1968

Kenneth W. Richardson et al.

It is certified that error appears in the above identified patent and that said Letters Patent are hereby corrected as shown below:

Column 11, line 41, before "essentially" insert -- consisting --.

Signed and sealed this 23rd day of September 1969.

(SEAL)
Attest:

Edward M. Fletcher, Jr.
Attesting Officer

WILLIAM E. SCHUYLER, JR.
Commissioner of Patents